(12) United States Patent
Hsiao

(10) Patent No.: US 6,448,967 B1
(45) Date of Patent: Sep. 10, 2002

(54) Z-BUFFER PRE-TEST FOR 3D GRAPHICS PERFORMANCE ENHANCEMENT

(75) Inventor: Chien-Chung Hsiao, Penhu Hsien (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 09/360,597

(22) Filed: Jul. 26, 1999

(51) Int. Cl.[7] .............................................. G06T 15/40
(52) U.S. Cl. ...................................................... 345/422
(58) Field of Search ............................... 345/422, 505, 345/506, 519, 531, 556, 564

(56) References Cited

U.S. PATENT DOCUMENTS 5,596,686 A * 1/1997 Duluk, Jr. ................... 395/122
6,154,223 A * 11/2000 Baldwin ...................... 345/506

* cited by examiner

Primary Examiner—Mark Zimmerman
Assistant Examiner—Lance W. Sealey

(57) ABSTRACT

Memory bandwidth is the bottleneck in a three-dimensional display system. A method with Z-Buffer pre-test reduces the memory accesses in the three-dimensional graphics system. This method includes two depth(Z) caches, a control logic for controlling memory access and two Z(depth) cache mechanisms. If the incoming pixel with Z-Buffer pre-test fails, then the pixel is discarded. Thus, the following texture mapping and other tests for the pixel are eliminated and memory accesses are reduced.

11 Claims, 6 Drawing Sheets

Z-BUFFER PRE-TEST FOR 3D GRAPHICS PERFORMANCE ENHANCEMENT

FIELD OF THE INVENTION

This invention relates to a display memory system to enhance 3D graphics performance, more particularly to a method for reducing memory access of texture mapping, scissor test, alpha test, stencil test, and depth test in a three-dimensional image.

BACKGROUND OF THE INVENTION

As is well known, a typical graphics. display system includes a processor, a frame buffer memory and a display monitor. The frame buffer memory stores digital data which include pixel information such as R, G, B, A value, depth(Z) value and texture images, etc. R, G, B values are the Red, Green, and Blue colors of every position (pixel) on a display and are read out to produce a full screen image. 'A' is referred to as Alpha value, which defines the transparency of every pixel. Depths or Z values define the depth of a three-dimensional image and are stored in a buffer memory referred to as a Z-Buffer, which is associated with the frame buffer. Texture images are stored in a buffer memory referred to as a texture memory, which is associated with the frame buffer. Texture images are applied to a three-dimensional image to produce a more realistic image. All of the information in each frame is read out and written in a frame buffer. Thus, the memory bandwidth limits the performance of the system.

Typically, in order to produce realistic three-dimensional images, every pixel may be reprocessed by a texture mapping, a scissor test, an alpha test, a stencil test and a followed Z-Buffer depth test. The texture mapping is a process to read the texture images from a texture buffer, choose the desired pixels from these images and then apply to each pixel. One texture mapped pixel may require one, two, four or eight pixels from different resolution texture images depending on various image qualities. These different resolution texture images are stored in texture memories in different locations. Thus, the texture mapping process usually causes random address accesses which have longer response time than continuous address accesses when using a typical memory. After the texture mapping, there may be other tests, for example: scissor test, alpha test and stencil test, depending on applications. Final test is the Z-Buffer depth test. Z-Buffer depth test is to compare the incoming pixel's depth value with the previous depth value stored in a Z-Buffer. This test is to read the previous depth value in the Z-Buffer, comparing it with new depth value to see whether this new pixel is in front of the pixel being displayed. If the test succeeds, then the new depth value is written to the Z-Buffer, and if the test fails, then this pixel is discarded. Z-Buffer test includes read/compare/write operations. Due to the long latency of memory response and the high frequent request of the texture memory, scissor test, alpha rest, stencil test and Z-Buffer, memory bandwidth is usually not sufficient to support a high performance display system. In order to improve the performance of a display system, the read and write requests of texture memory, alpha test, stencil test and Z-Buffer memory should be reduced.

SUMMARY OF THE INVENTION

In order to overcome the bottleneck problem about the memory, if we can discard those pixels which are in back of the present pixels, then we can reduce the memory access. The present invention provides a method to reduce the memory access of texture mapping, scissor test, alpha test and stencil test. This invention includes two caches, one cache is "Pre-Test Z Cache" which stores the depth(Z) value for Z pre-test stage from the texture mapping and the other cache is a "Z Buffer Cache" which stores Z(depth) values and writes Z value back to the frame buffer. In order to preserve the depth order, the Pre-Test Z Cache and Z Buffer Cache are "first in first out" memory.

The depth value is fetched before texture mapping and stored in Pre-Test Z Cache. The Z pre-test is performed before texture mapping, alpha test, stencil text and Z-Buffer test. The pixel is discarded if it fails in Z pre-test and then the followed memory access is eliminated.

DETAILED DESCRIPTION OF THE PREFERRED EMBODIMENT

Figure 1:
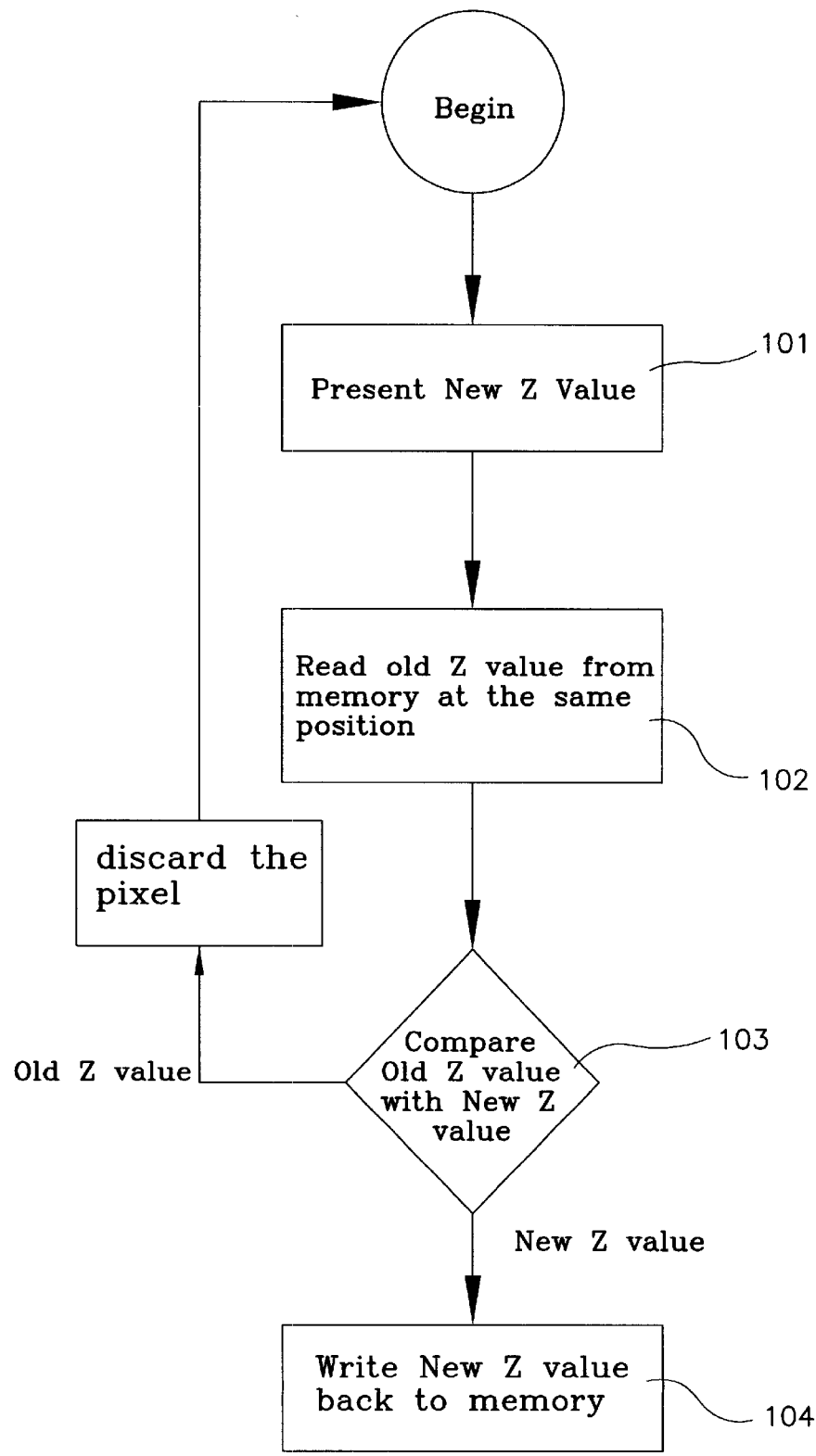
FIG. 1 is a flow chart of a typical depth (Z) test in a three-dimensional display system.

FIG. 1 shows the typical depth (Z) test in a three-dimensional display system. When the system receives the new depth (Z) value, the process fetches the previous depth value of the same screen coordinate from memory (step 101) and then compares the new depth value with the previous depth value (step 102). If the test succeeds, then the new depth(Z) value is written into memory (step 104). If the test fails, the process discards the pixel and continues with the next pixel (step 105). This flow has been followed in many typical three-dimensional display systems. But this method fetches the depth(Z) value from memory for every new pixel every time. This degrades the overall performance due to the long latency of memory access.

Figure 2:
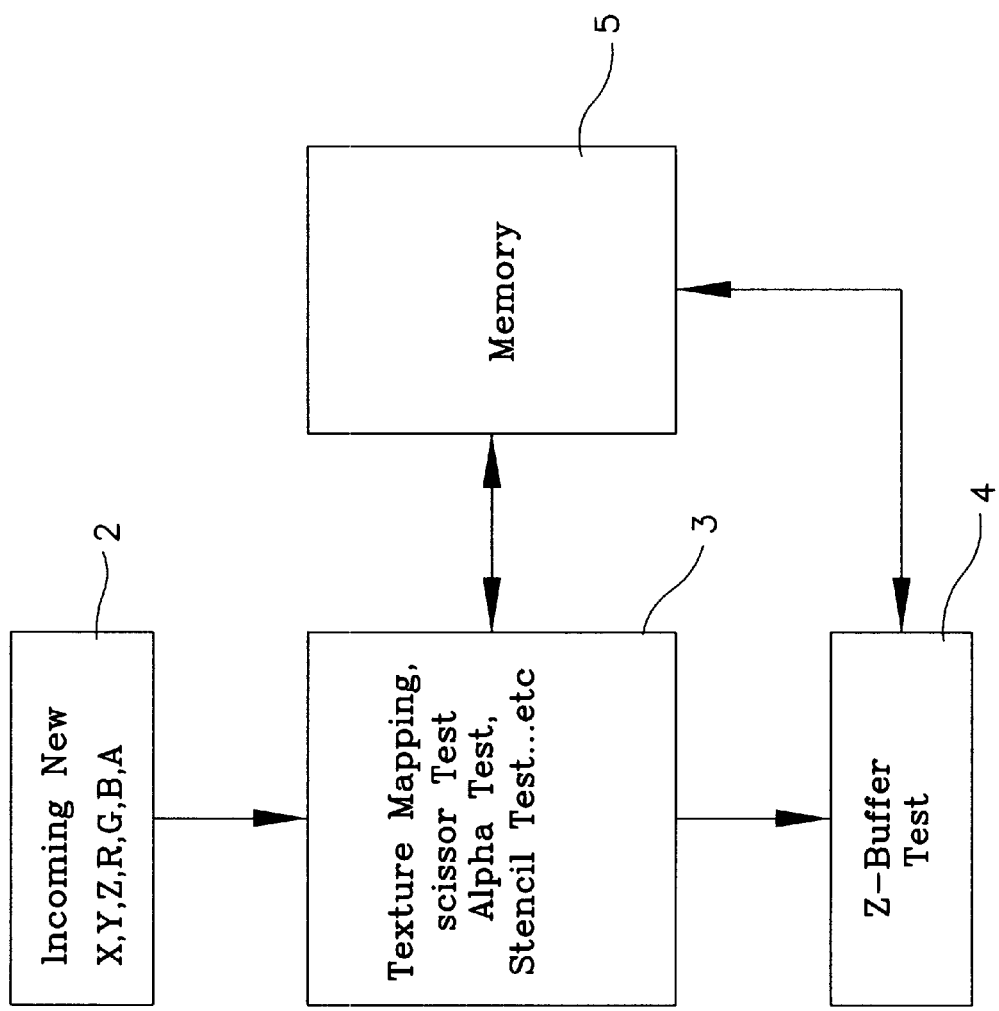
FIG. 2 shows the simplified block diagram of memory access in a typical graphics system.

FIG. 2 shows the memory access in a typical three-dimensional display system. The incoming new X, Y, Z, R, G, B, A are calculated in a previous stage (not illustrated in the figure) before texture mapping. The texture mapping, alpha test and stencil test consume a lot of memory bandwidth. The heaviest memory bandwidth loading is texture mapping. It may consume from several million bytes to gigabytes per second depending on how much texture detail will be shown on a display. The typical memory bandwidth is not sufficient to support texture mapping, and the system may stall to wait for memory response and thus the performance is degraded. The present invention is to solve this problem by a Z pre-test. If the pixel passes the Z pre-test and all other tests, then the Z-Buffer depth test 4 is performed.

Figure 3:
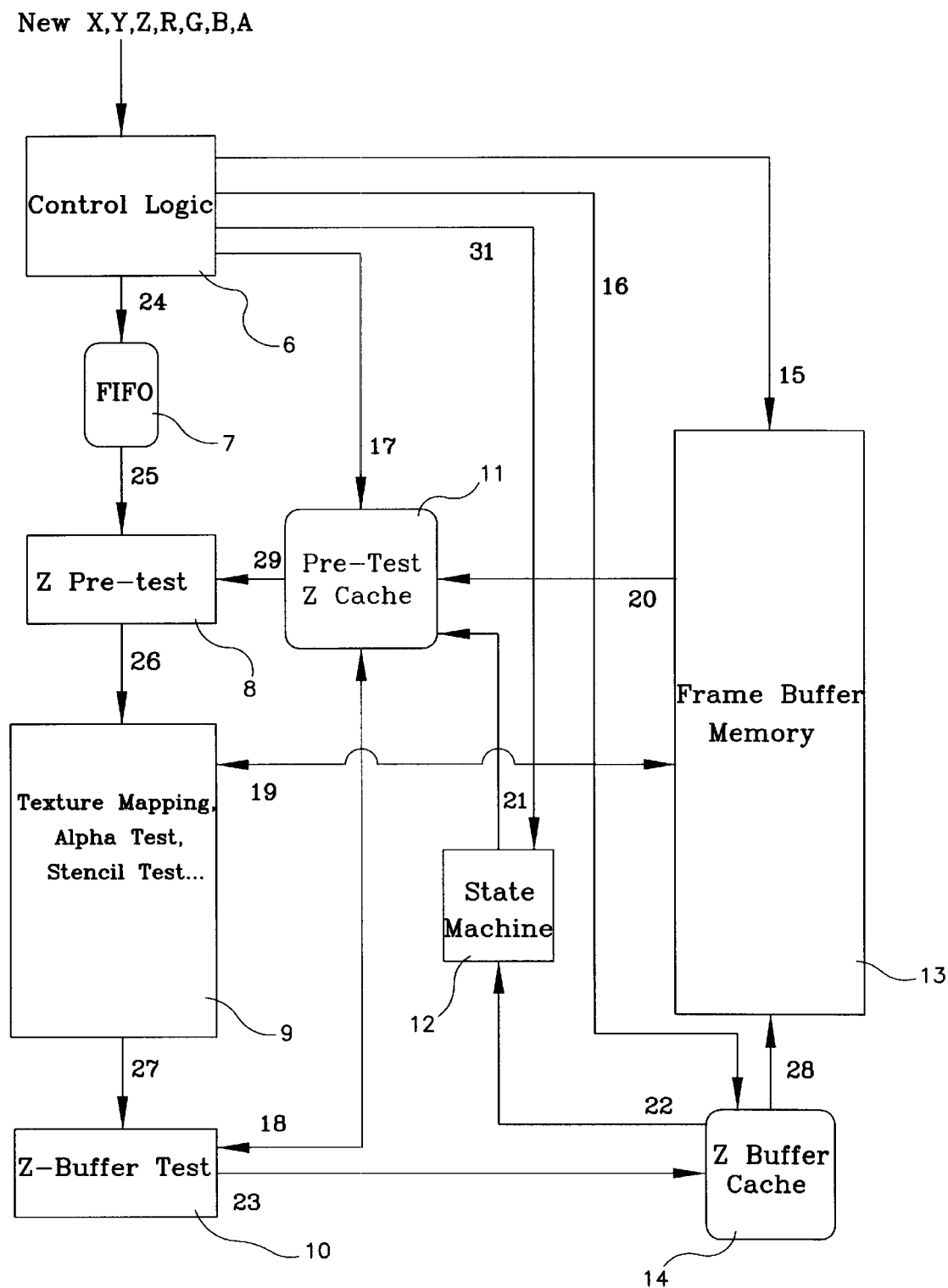
FIG. 3 shows the block diagram of the present invention.
Figure 4:
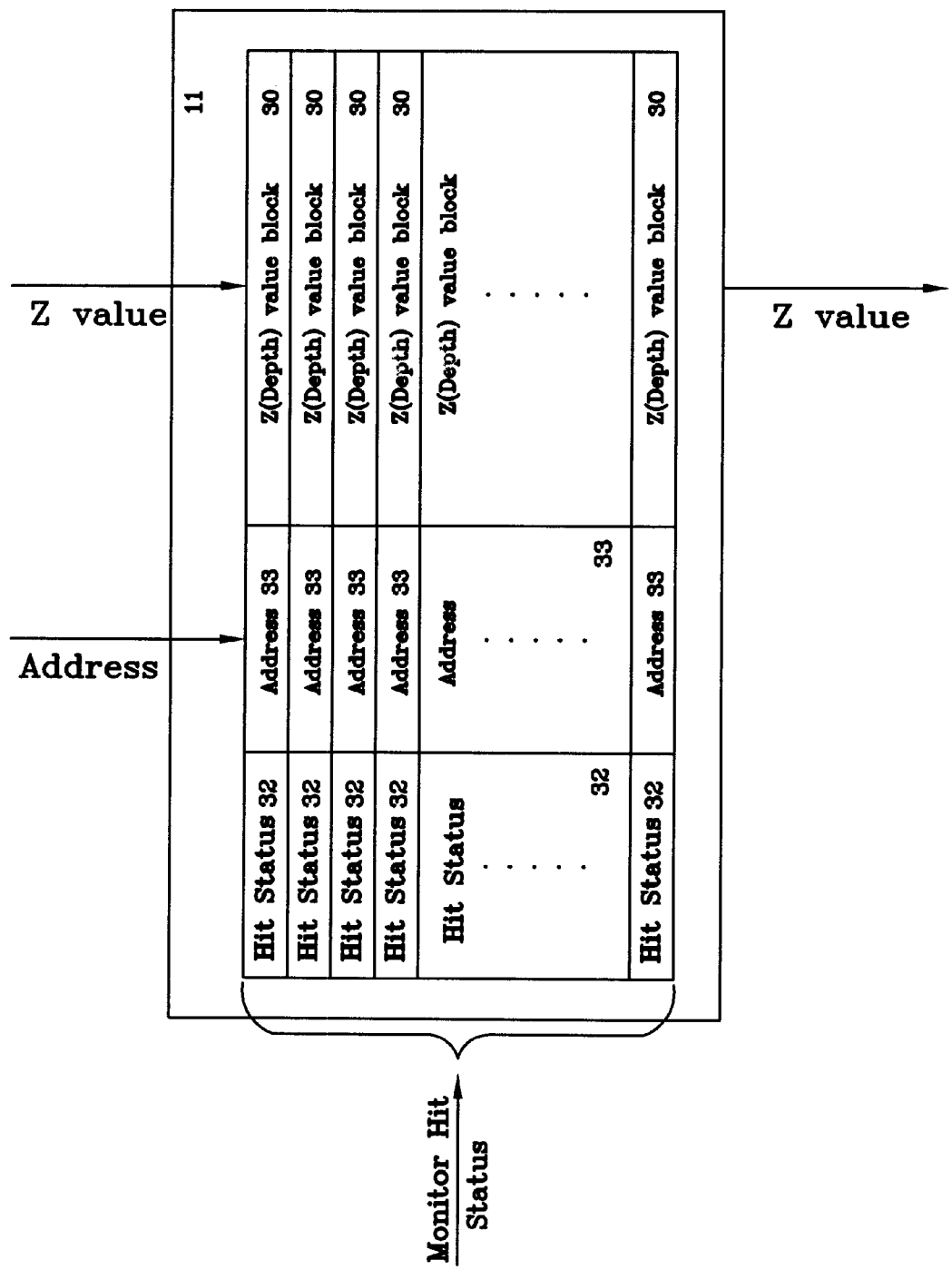
FIG. 4 is a block diagram illustrating a portion of FIG. 3 in more detail.

FIG. 3 shows the block diagram of the present invention. A pre-Test Z Cache 11 and a Z Buffer Cache 14 are "First In First Out" like caches with a hit status 32 as shown in FIG. 4. The Control Logic 6 receives the incoming new X, Y ,Z , R, G, B, A from the previous stage. When new X, Y, Z, R, G, B, A values are ready, the Control Logic 6 issues a read request 15 to a Frame Buffer memory 13 and reads out the depth values into the Pre-Test Z Cache 11. Memory access may require long latency, and thus the pipeline should stall to wait for the Pre-Test Z Cache to receive depth(Z) value from the Frame Buffer memory 13 and then continues to do Z pre-test. FIFO (first in first out buffer) 7 is used in this invention to avoid stalling the pipeline. The Control Logic 6 gets the new pixel, issues the memory access, puts the new pixel into FIFO and then continuously processes the next new pixel. The new pixels stay in FIFO and follow the first in first out mechanism. When a pixel goes into the Z pre-test stage, the Pre-Test Z Cache 11 has received this pixel's depth value from the Frame Buffer memory 13. The Z pre-test is performed. After the Z pre-test, in block 9, the texture mapping, alpha test and stencil test, . . . , etc, are performed. Block 9 includes many memory accesses, especially when performing texture mapping. After block 9, at the end is Z Buffer test 10.

FIG. 4 is a block diagram illustrating more detail in FIG. 3 about Pre-Test Z Cache 11 and Z Buffer cache 14. The Pre-Test Z Cache is identical to the Z Buffer cache. These caches store depth(Z) value. The depth(Z) value may be updated according to the result of Z Buffer Test 10. Incoming pixels from FIFO 7 passing through Z pre-test 8, block 9 to Z Buffer 10 require many cycle time. The Z Buffer Cache 14 always stores the newest and accurate depth(Z) value after the Z Buffer test. It may happen that the Z Buffer Cache 14 and the Pre-Test Z Cache 11 store different depth(Z) values at the same screen coordinate, and thus the Pre-Test Z Cache's depth(Z) value is a previous depth(Z) value and may cause Z pre-test error. This case happens when the Z pre-test 8 and Z Buffer test 10 access the same position at the same time and the Z Buffer test 10 succeeds. This case may result in reading wrong depth(Z) values into the Z pre-test 8 stage. In order to avoid fetching wrong depth(Z) value in Z pre-test 8 and Z Buffer test 10 stage, the mechanism of Pre-Test Z Cache and Z Buffer Cache is first in first out. The depth(Z) value that goes into cache will be read out first. With this first in first out mechanism, the depth(Z) value won't be changed by incorrect updating. These caches store address, Z(depth) value block 30 and hit status to achieve an accurate depth(Z) value test. One input address is decoded to map to one Z(depth) value block 30. The Z(depth) value block includes several depth values whose positions are continuous on screen coordinate. For example: 4 LSB bits of screen coordinate can be decoded to map to one Z(depth) value block 30 of 16 bytes of depth values. The incoming new depth(Z) values are usually continuous in screen coordinate, and thus the Z pre-test 8 and the Z Buffer test 11 fetch one Z(depth) value block 30 from cache every time. This method can reduce the cache access. The more detail data flow is shown in FIG. 5.

Figure 5A:
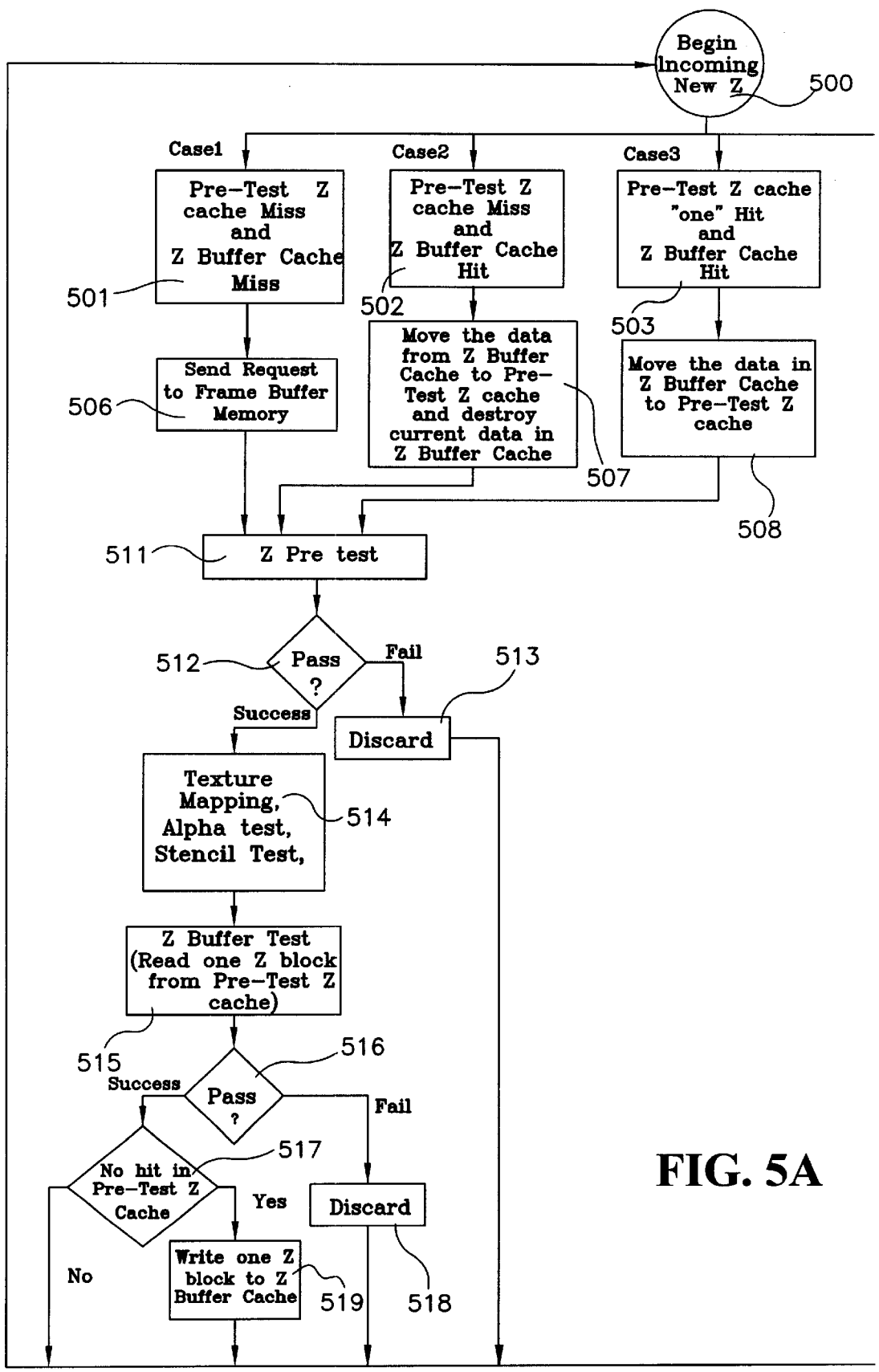
FIG. 5A is a flow chart of the present invention.
Figure 5B:
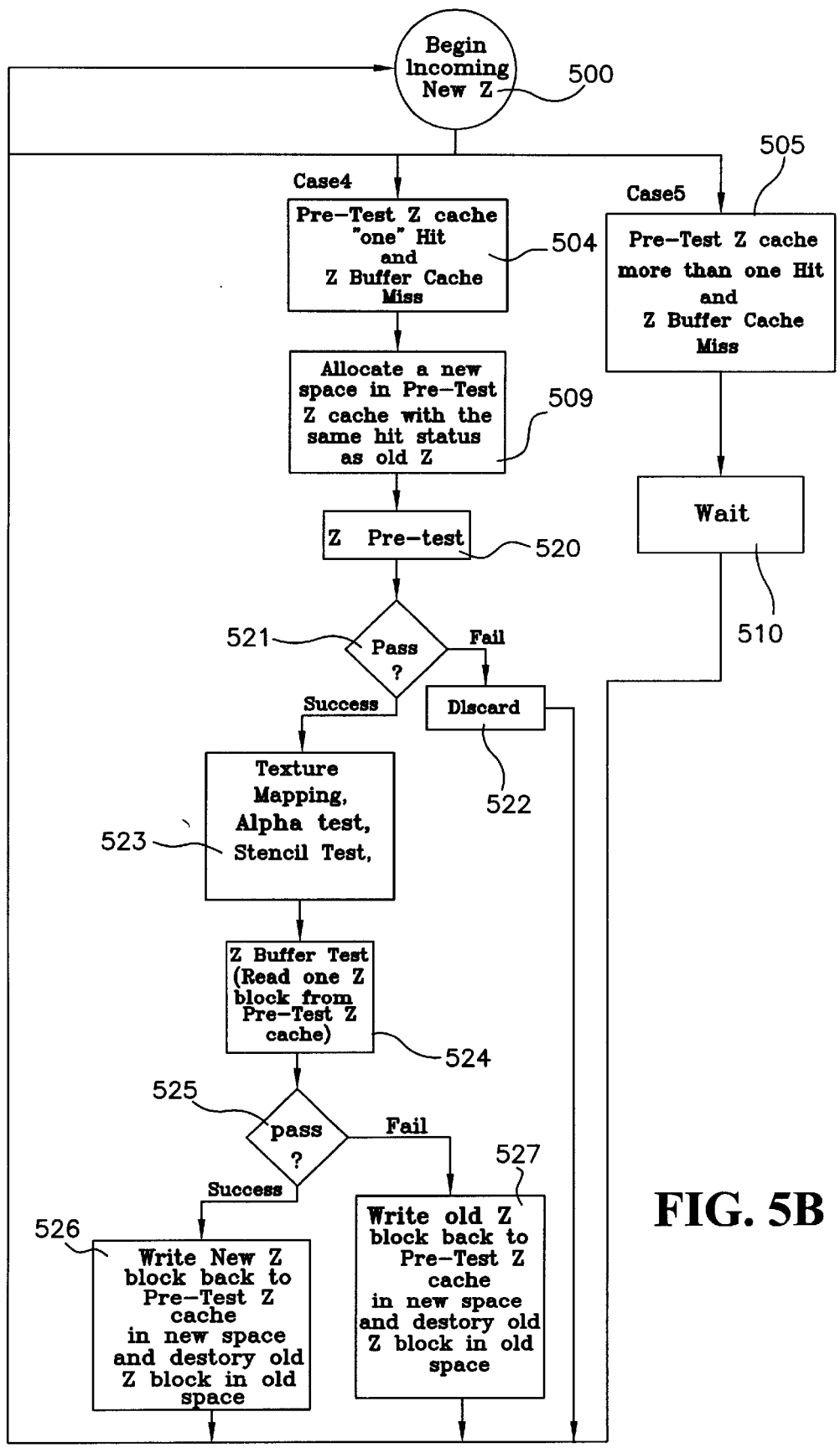
FIG. 5B is another flow chart of the present invention.

FIGS. 5A, and 5B illustrate the detail mechanism of the present invention. At beginning, Control Logic 6 gets new Z value (step 500), and then the Control Logic 6 monitors the Pre-Test Z Cache 11 and the Z Buffer Cache 14 to determine whether the depth(Z) value of the same incoming pixel's screen coordinate is in these two caches. There are five possible cases of cache hit. Control Logic 6 controls the Frame Buffer memory 13, Pre-Test Cache 11 and Z Buffer Cache 14 by the results of five cache hit cases. If the depth(Z) value with the same screen position is in the cache then the hit status of that block is enabled and referred to as a "hit". If it's not in the cache, it is referred to as a "miss". The size of data suitable for accessing the Frame Buffer memory 13, the Pre-Test Z Cache 11 and the Z Buffer Cache 14 is one Z(depth) value block 30. The following illustrates more detail of these five cases with reference to FIGS. 5A and 5B.

Case 1: both Pre-Test Z Cache 11 and Z Buffer Cache 14 miss (step 501). Then Control Logic 6 sends a request to Frame Buffer memory 13 (step 506) and the depth(Z) value is read into a Pre-Test Z Cache 11 (step 511). After performing Z pre-test, if Z pre-test fails, then this pixel (step 513) is discarded. If it succeeds, then the texture mapping, alpha test, stencil test (step 514) and Z Buffer test 10 are performed sequentially (step 515). If the Z Buffer test 10 fails, then this pixel (513) is discarded. If it succeeds and there is no hit with this Z(depth) value block in the Pre-Test Z Cache (step 517), the new depth(Z) value is written to Z Buffer Cache 14 for the processing of the next new incoming pixel (step 519). If there is a hit with this Z(depth) value block in Pre-Test Z Cache, the process goes to Case 4 or Case 5.

Case 2: the Pre-Test Z Cache is a miss but the Z Buffer Cache is a hit (step 502). Then the Control Logic 6 sends a command 31 to state machine 12. The state machine 12 allocates a space in the Pre-Test Z Cache and moves the "hit" Z(depth) value block 30 from Z Buffer Cache 14 to Pre-Test Z Cache 11 and destroys current hit in Z Buffer Cache 14 (step 507). After this, the same flow of Case 1 including Z pre-test, texture mapping, alpha test, stencil test and Z Buffer test is followed.

Case 3: there is one "hit" both in Pre-Test Z Cache 11 and Z Buffer 14 (step 503). Because the newest Z value is in the Z Buffer Cache 14, Control Logic 6 issues a command 31 to state machine 12 to move the "hit" Z(depth) value block 30 from Z Buffer Cache 14 and overwrite the Z(depth) value block 30 in Pre-Test Z Cache 11 (step 508). Thus the Z pre-test won't fetch previous depth value in Z pre-test stage 8. The following steps are the same as Case 1.

Case 4: there is one "hit" ("hit 1") in Pre-Test Z Cache and the Z Buffer Cache is a miss (step 504). The Control Logic 6 allocates a new space in the Pre-Test Z Cache as "hit 2" and sets its hit status identical to the current "hit 1" (step 509), but keeps its Z(depth) value block 30 empty. After that, the new pixel from FIFO enters the Z pre-test stage (step 520). The Z pre-test fetches the Z(depth) value block 30 of "hit 1" and do Z pre-test. Subsequently, texture mapping, alpha test, stencil test (step 523) and Z Buffer test (step 524) are performed. In the Z Buffer test stage 10 if the test is successful, then the new Z(depth) value block is written to the position of "hit 2" and "hit 1" is destroyed (step 526). If the test is failed, then the Z(depth) value block of "hit 1" is written to "hit 2" and "hit 1 " is destroyed (step 527). After this, it continues to process next pixel.

Case 5: there are more than one hit in Pre-Test Z Cache 11 and Z Buffer Cache 14 is a miss (step 505). The pipeline should stall and wait until there is only one hit in Pre-Test Z Cache 11. Then the process goes to Case 4.

The Control Logic 6 manages the Frame Buffer memory 13, Pre-Test Z Cache 11 and Z Buffer Cache 14 accesses in five cases as mentioned above. And if the Z Buffer Cache is full, the Z(depth) value is written to update Frame Buffer memory 13.

This invention provides a method to perform Z pre-test by carefully managing the Pre-Test Z Cache 11 and the Z Buffer Cache 14. Discarding those pixels that fail in Z pre-test can reduce the memory access of texture mapping and other tests.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of hidden surface removal with a Z pre-test for reducing memory access of a three-dimensional display system having a Pre-Test Z Cache, a Z Buffer Cache, a Frame Buffer memory, said method comprising the steps of:
   (a) reading a Z value and a screen coordinate of a new pixel;
   (b) using a control logic to control said Pre-Test Z Cache, said Z Buffer Cache and said Frame Buffer Memory according to cache hit status of said Pre-Test Z Cache and said Z Buffer Cache to fetch a current Z value at said screen coordinate;
   (c) performing a Z pre-test;
   (d) discarding said new pixel if said Z pre-test fails;
   (e) performing a plurality of data tests for said new pixel if said Z pre-test passes;
   (f) performing a Z buffer test; and
   (g) updating said Z Buffer Cache and said Pre-Test Z Cache according to the result of said Z Buffer test and said cache hit status of said Pre-Test Z Cache and said Z Buffer Cache.

2. The method according to claim 1, wherein said plurality of data tests include a texture mapping, an alpha test, and a stencil test.

3. The method according to claim 1, wherein said control logic is an integrated circuit that monitors said cache hit status of said Pre-Test Z Cache and said Z Buffer Cache, issues memory access commands to said Frame Buffer memory, and controls said Pre-Test Z Cache or said Z Buffer Cache according to said cache hit status.

4. The method according to claim 1, wherein controlling said Pre-Test Z Cache or said Z Buffer Cache in said step (b) comprises:
   (b1) providing a first-in first-out memory buffer for storing a plurality of Z entries for a plurality of continuous screen coordinates, each Z entry including an address, a Z value block and a hit status of a screen coordinate; and
   (b3) setting the hit status of the Z entry corresponding to the screen coordinate of a new pixel if the corresponding Z entry is in said first-in first-out memory buffer.

5. A method of hidden surface removal with a Z pre-test for reducing memory access of a three-dimensional display system having a Pre-Test Z Cache, a Z Buffer Cache, a Frame Buffer memory, said method comprising the steps of:
   reading a Z value and a screen coordinate of a new pixel;
   using a control logic to control said Pre-Test Z Cache, said Z Buffer Cache and said Frame Buffer Memory according to cache hit status of said Pre-Test Z Cache and said Z Buffer Cache to fetch a current Z value at said screen coordinate;
   performing a Z pre-test; and
   discarding said new pixel if said Z pre-test fails;
   wherein a FIFO is provided to said control logic for buffering new pixels before performing said Z pre-test for balancing memory response and data flow to avoid pipeline stalling caused by waiting for a response from said Frame Buffer Memory.

6. A method of hidden surface removal with a Z pre-test for reducing memory access of a three-dimensional display system having a Pre-Test Z Cache, a Z Buffer Cache, a Frame Buffer memory, said method comprising the steps of:
   reading a Z value and a screen coordinate of a new pixel;
   using a control logic to control said Pre-Test Z Cache, said Z Buffer Cache and said Frame Buffer Memory according to cache hit status of said Pre-Test Z Cache and said Z Buffer Cache to fetch a current Z value at said screen coordinate, said cache hit status having five states including:
      (i) both said Pre-Test Z Cache and said Z Buffer Cache being missed;
      (ii) said Pre-Test Z Cache being missed and said Z Buffer Cache having a hit Z value block;
      (iii) said Pre-Test Z Cache having a hit Z value block and said Z Buffer Cache having a hit Z value block;
      (iv) said Pre-Test Z Cache having a hit Z value block and said Z Buffer Cache being missed; and
      (v) said Pre-Test Z Cache having more than one hit Z value block and said Z Buffer Cache being missed,
   performing a Z pre-test; and
   discarding said new pixel if said Z pre-test fails.

7. The method according to claim 6, wherein in said state (i), said control logic sends a request to said Frame Buffer Memory, and said Frame Buffer Memory returns a Z value into said Pre-Test Z Cache.

8. The method according to claim 6, wherein in said state (ii), said control logic copies the hit Z value block in said Z Buffer Cache to said Pre-Test Z Cache and destroys the hit Z value block in said Z Buffer Cache.

9. The method according to claim 6, wherein in said state (iii), said control logic copies the hit Z value block in said Z Buffer Cache for overwriting the hit Z value block in said Pre-Test Z Cache.

10. The method according to claim 6, wherein in said state (iv), said control logic allocates a new space including a hit status and a Z value block in said Pre-Test Z Cache and sets the hit status and clears the Z value block of said new space; and said method further comprises the steps of:
    performing a plurality of data tests for said new pixel if said Z pre-test passes;
    performing a Z buffer test;
    copying the hit Z value block in said Pre-Test Z Cache into said new space if said Z Buffer test fails; and
    writing the Z value of said new pixel into said new space if said Z Buffer test passes.

11. The method according to claim 6, wherein in said state (v), said control logic stalls to wait until there is only one hit Z value block in said Pre-Test Z Cache and then continues.

* * * * *